A. C. HORN.
PLASTIC WATERPROOF TROWELING COMPOUND.
APPLICATION FILED APR. 9, 1913.
1,074,364.
Patented Sept. 30, 1913.
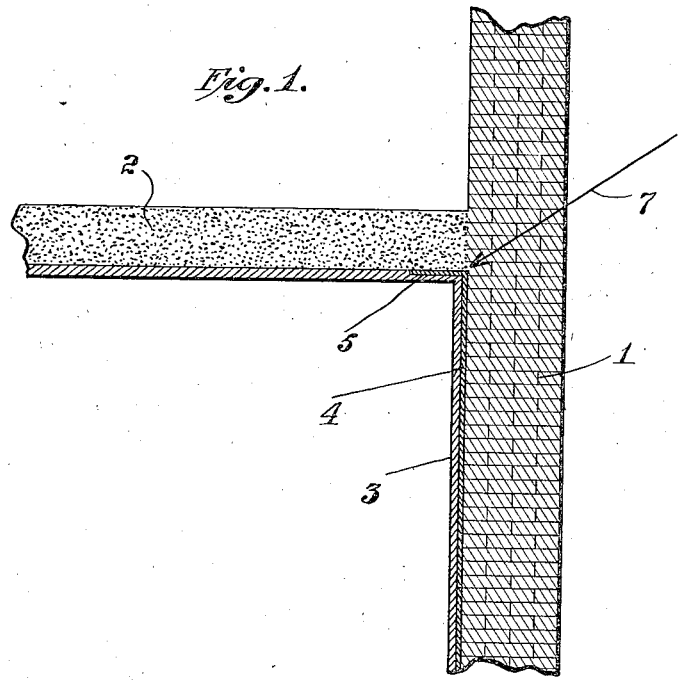
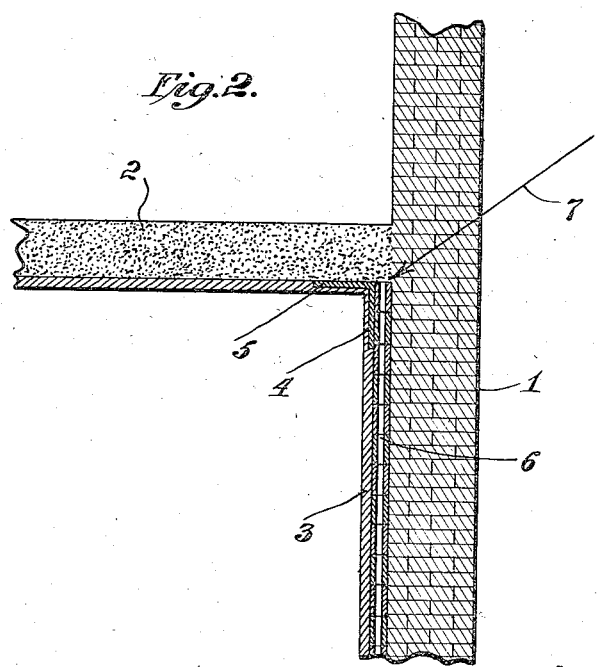

UNITED STATES PATENT OFFICE.

AARON C. HORN, OF NEW YORK, N. Y.

PLASTIC WATERPROOF TROWELING COMPOUND.

1,074,364.  Specification of Letters Patent.  Patented Sept. 30, 1913.

Application filed April 9, 1913. Serial No. 760,050.

*To all whom it may concern:*

Be it known that I, AARON C. HORN, a citizen of the United States, and a resident of New York, in the county of New York and State of New York, have invented certain new and useful Improvements in Plastic Waterproof Troweling Compounds, of which the following is a specification.

This invention relates to plastic troweling waterproof cements intended for waterproofing structural surfaces and the like, and to the process of making same, involving a new form of waterproofed structure, and as to the composition it relates especially to a cement having a high degree of plasticity or stiffly fluent mobility, marked adhesiveness to wall surfaces, yet working freely under the trowel without that measure of tackiness and "pull" which characterizes most resinous mixtures of similar body.

The treatment of structural surfaces of brick, concrete and other forms of masonry more or less porous and moisture transmitting in character to render same either impenetrable by moisture or to act as a moisture barrier usually resolves itself into the application to such surfaces of bitumen, paints or oil and resin compounds and the like, which although useful for waterproofing the surfaces of wood, often do not serve in filling the pores of rough surfaces of masonry to a degree sufficient to insure reliability of water shedding or deflecting qualities under all conditions. Sub-structural or below ground waterproofing such as the treatment of foundation walls usually is carried out either by the hot method, that is, the application of pitch or an asphaltic compound which has been previously heated in order to liquefy same; or by the cold method involving the application of a bituminous paint by brushing. The hot method is open to the objection that the prolonged heating of the material during the operation, especially as usually conducted by unskilled workmen having very little thought of temperature requirements, tends to give a product of variable composition which often is undesirably brittle. Thus any vibratory movement or settling of the walls will tend to rupture the coating and the slightest break in such a coating destroys almost entirely the efficacy of the waterproofing stratum. Another objection to the hot method is that "green" concrete or masonry surfaces contain sufficient moisture to act repellently toward a body of highly heated material applied to such surfaces, possibly because of the generation of water vapor at the time of application of the heated material. Hence the adhesion of tar or asphalt to such surfaces is never pronounced. In addition there is to be considered the cost of setting up and firing such apparatus for locally heating the material each time the composition is to be applied. The cold method avoids the necessity of local heating and melting the waterproofing material, with all the incident troubles and inconveniences, and cold applied bituminous coatings are available which carry in proper physical and chemical form, all of the oils necessary for the life and efficiency of such coatings, but their field is restricted mainly to the waterproofing of perfectly smooth walls and floors, since it is an extremely difficult matter to produce by brush coating an unbroken film over a surface which is broken by irregularities of various sorts, depressions, projections, cracks and crevices; as for instance a rough brick, stone or concrete wall, or an underbed of stone concrete forming part of a floor, usual surface rugosities of which, make the effective application thereto of a brush coating difficult and costly.

In superstructural waterproofing, that is the treatment of walls above ground, it becomes necessary to insulate or dampproof an inner plastered surface from an outer weather exposed wall, and the present practice involves three methods, viz., that of furring, lining with hollow block, and coating with a bituminous paint. The furring operation is carried out by attaching to the wall furring strips in vertical position and securing lath or plaster board to these strips. The furring strips may be of angle iron, wood or metal covered wood and the laths may be metal or wood strips. Sheets of prepared furring board may be used in lieu of laths. Plaster is applied to the surface thus created and being spaced a short distance from the masonry wall, and thus out of direct contact with it, is to some extent insulated from the moisture containing outer wall. Or the wall may be lined in various ways with hollow brick or block to which the plaster is subsequently applied. The third method of superstructural dampproofing is that of applying to the inner surface of the wall, by brush or sprayer, of a liquid bituminous coating so prepared that plaster will bond to it, in this way insulating the plaster from the wall; a procedure which has several advantages over the preceding methods, among which advantages may be mentioned the saving in cost because of the simplicity of the process, the insulating efficiency secured by reason of locking the pores in the masonry with an air proof and dampproof compound, and the resultant economy in space as contrasted with the space necessitated in furring and lathing. The one disadvantage of the brush application of a bituminous paint or coating of this character to form a waterproof sheath between masonry and plaster is that since the coating is applied by brushing it cannot be made to form a continuous impervious film over ragged uneven surfaces, as the brush it not able to adequately reach the interstices or depressions. Neither can the application of such compositions by means of spraying devices be recommended for the reason that under the circumstances a relatively large proportion of thinning material is required to give the composition a sufficient degree of fluidity to spray properly. Thus the bituminous base on which depends waterproofing efficiency, is greatly diluted and is correspondingly less effective. Then too, while the work is being carried out, the building in large measure is open on all sides and the slightest breeze will disturb the path of travel of the fine spray, causing a considerable proportion of the atomized particles to drift away, often to deposit in places where not desired and thus involving the expense of removing the material where extraneously deposited.

By my invention a fluent composition is secured which overcomes the disadvantages of the brushed out coating, while possessing the advantages thereof, which may be troweled on a surface and worked into its irregularities, which will adhere well even to damp masonry, and which will form a continuous waterproofing sheath over any surface however rugged, uneven or irregular such surface may be.

My process of preparation enables a composition to be produced in the form of a heavy paste, thick and coherent enough to not drip under the trowel, of sufficient body to not sag after application, but in spite of its high measure of consistency spreading freely and smoothly under the trowel, or in the parlance of the trade—working out not "short" but free and "fatty." Moreover the composition so prepared exhibits a remarkable plasticity enabling application with satisfactory results to expansion joints in concrete, as said composition will expand and contract perfectly with the movement of the concrete slab. In a similar manner, used under roof tile, water penetration can be prevented, simply by embedding the laps of Spanish tile, hip rolls, finials, crestings of shingle tile, and the like, in a layer of the plastic composition. Although exposed here to the full heat of the sun's rays the coating remains in place persistently, serving as an efficient waterproof seal. Repairs in roofs, whether of slate, tin, built up slag or gravel strata, may be repaired simply by troweling on a quantity of said composition to fill and cover the leaky areas. Likewise for covering openings where flashing enters the wall, pointing around flashing, for cementing cap to flashing on the underside, the composition may be used to advantage especially on damp surfaces where ordinary cements fail to properly adhere. Around window frames secure protection can be provided against water-penetration from driving storms by applying the composition to openings under the hanging stile, filling in between frame and wall on stucco exteriors, or in any rift or crevice in the window setting. While plastic enough to be used for filling in spaces and slushing around window frames, the composition trowels in place neatly without sagging and sets without becoming hard and brittle, which is an advantageous feature. Although not running and dripping in the heat of the sun's rays, on the other hand a brittle easily fractured product is not engendered by cold, because of the peculiar irresponsiveness to temperature fluctuations of the compound in its preferred form.

The composition may be prepared without the use of any volatile inflammable thinner, so that in the handling and application of the product, the fire risk is negligible.

Where floor arch and wall join, if the ceilings are to be preserved from dampness, a waterproofing material should be present at such junction. In order to carry their loads, the floor arches become a part of the bearing wall, or must be supported by the steel frame when curtain walls are used. Hence the air space created by furring blocks or by lath and furring strips cannot be continuous. Wherever this is the case, and it is so in every fireproof structure, or for that matter in wooden construction, moisture permeating the outer shell of the building at the point where the arch joins the wall, penetrates the floor arch for some distance at least and affects the plastered ceiling. The arches, usually being made of hollow tile or "strongly diluted" concrete, become an easy prey to the attacks of rain storms and are quickly saturated with moisture at the junction points, causing the ceiling to become stained and discolored. From thence, if furred construction is employed, the moisture will travel down the wall along the surfaces inclosing the air space, saturating and disintegrating the plaster. Whenever then, it becomes desirable to use furring, as often is the case especially if the interior plan of the building requires the trim to be set out from the wall, and the expense of supplementing the effect of the air space by a water insulating coating throughout, is an obstacle, it becomes necessary to seal the space at the junction point where furring and arch meet, as this is the vulnerable point of attack from dampness. My plastic waterproof troweling composition applied at this point overcomes the difficulty experienced with this form of construction, and due to the marked adhesiveness to damp walls exhibited by the aforesaid composition, a remarkably thorough sealing effect is secured with a minimum of coated area.

As indicated, the walls in new construction are always more or less damp and this moisture has a tendency to repel a coating of ordinary bituminous, asphaltic or coal tar mixtures, the action reminding one of the repellent effect of a greasy surface. Wherever moisture is present, the coating film does not bond or key to the surface and after setting may be totally removed with relative ease. The present invention provides a composition, which although possessing an unusually pronounced waterproofing character, is nevertheless, in the form as applied, of such a nature as to overcome the repellent forces due to wall moisture, and hence for the purposes above set forth is of peculiar adaptability.

My plastic troweling waterproof sealing cement comprises a heavy-bodied emulsion of stiffly fluent quality containing an oil basis, preferably thickened with a resinous or asphaltic compound; a water-insoluble soap and a finely divided filler. The emulsion preferably is formed from two immiscible materials, namely, the oil basis and a weak aqueous solution of ammonia or similar material; the oil basis being preferably largely in excess of the aqueous solution. The latter in fact preferably should be present only in relatively small proportion so as to form but a modicum of the total weight of the troweling compound. As an oil basis I may use any of the drying oils, as linseed, perilla, Chinese wood or tung oil, and the like, or semidrying oils including fish, corn, cotton, whale, rape and other like oils. Non-drying oils as petroleum, asphaltic oils and malthas may be employed to some extent or according to circumstances may form the entire oil basis, if desired. Preferably however I employ Chinese wood oil usually with an addition of about 10% of boiled fish oil. The oil thickener which I may employ is usually of a resinous nature and includes such bodies as asphalt, gilsonite, copal including manila and kauri, colophonium and other resins. Ozocerite or ceresin wax may be added in moderate amounts for some requirements. The water-insoluble soap preferably is formed *in situ*, that is within the mass of the composition during its preparation. To this end a water-soluble soap preferably ammonium stearate in an aqueous carrier, is incorporated with the oil basis and hydrated lime or other precipitant is then added. The lime soap which forms separates under these conditions in a finely-divided, flocculent or colloidal condition which enables it to exert a desirable water-repelling action. The ammonia liberated by the action of the lime passes more or less into the aqueous material and forms an excellent aid to rapid emulsification. The water-insoluble soap and the aqueous material together have the useful property of permitting additions of fillers, pigments and extending materials, without excessive grinding to secure a proper degree of incorporation. This is of importance with a heavy oil basis in which pigments and fillers are ground with difficulty under most circumstances. The precipitating material for the water-soluble soap may be any metathetically reacting body capable of producing a water-insoluble soap, and this includes Portland cement, barium hydrate, quick lime, cream of lime, as well as hydrated lime. An excess of lime material over the amount of ammonium stearate and the like, should preferably be used. On the other hand a very great excess of lime or other precipitant is undesirable as tending to break the emulsion, and only such a maximum is to be used under ordinary circumstances as will permit of the formation of a stable emulsion and one which is free from undesirable tackiness or sticky qualities. The function of the aqueous material in its blended condition is that of a slicking element, it having the property of rendering an otherwise sticky, tacky composition easily handled under the trowel, an action which seemingly is supplemented by the presence of the precipitated lime soap.

A formula herewith given as an illustrative embodiment is the following:—A thickened oil basis consisting of 70 parts of Chinese wood oil, 10 parts of boiled fish oil and 20 parts of asphalt is mixed with 40 parts of a thick paste of ammonium stearate in aqueous media. Seventy parts of hydrated lime or Portland cement are then added with thorough agitation. To this composition filling or extending material may be added provided the consistency be not increased to an excessive degree. Among the fillers which may be employed are bodies of the nature of talc or ground soap stone, whiting, barytes, china clay and kaolin, silex and the like. The foregoing proportions are expressed by volume for the particular formula set forth.

The manner in which the troweling composition is applied is shown by the accompanying drawings, which do not indicate all forms of construction wherein the present composition may be used, nor all methods or modifications of methods of application, but simply and in a diagrammatic manner set forth illustrative procedures.

The drawings represent vertical cross sections of walls and floors of structures, Figure 1 being a cross section of a portion of a masonry wall and adjoining concrete floor with the troweling composition in direct contact with the wall interior surface and a portion of the ceiling, while Fig. 2 shows a wall and ceiling in annular cross section with a furring layer of hollow block or tile and a sheath of the troweling composition locally disposed at the junction of floor and wall.

Like parts in the drawings are denoted by like characters.

In the drawings, 1 is a wall of brick, concrete or other similar material, 2 is a floor shown as composed mainly of concrete, 3 is a finish of plaster, 4 is a waterproofing compound, extending along the face of the vertical wall or furring, and having the overhead extension 5. The direction of ingress of moisture is graphically indicated by the arrow 7. In Fig. 2 the vertical portion of the waterproofing compound contacts with hollow tile furring but does not extend along the vertical wall over its entire surface, but only for a short distance below the ceiling. A sheath of waterproofing material disposed in this manner enables water to be repelled or resisted at what heretofore has been a vulnerable point. Most waterproofing compositions fail to hold well at this point, either cracking or blistering or suffering other deterioration. My plastic troweling waterproof sealing cement permits of the foregoing process of application to be successfully carried out and affords a structural organization of novel and useful properties.

The adherence of the sealing compound or cement to damp surfaces at the point where the floor arch joins the wall overcomes the difficulties hitherto experienced in waterproofing construction of the character aforesaid. Furthermore the compound may be made to bond or join with plaster in an effective manner. Whether any chemical action takes place under these circumstances I need not here state, it sufficing to mention that wet plaster may be applied to the layer of waterproofing compound applied to a wall or underside of floor arch, and will adhere thereto firmly in spite of the oily nature of the waterproofing compound. This is all the more remarkable in view of the fact that irregularities of surface and brush marks present when bituminous paints are applied to such surfaces are not here existent so that little or no physical foothold is available for the plaster layer.

What I claim is:—

1. The process of making a plastic troweling waterproof cement which comprises melting asphaltic material, thinning same with a drying oil, adding an aqueous paste comprising ammonium stearate, agitating and adding lime material; whereby calcium stearate is formed within the mass and ammonia is liberated.

2. The process of making a plastic troweling waterproof cement which comprises melting varnish gum, incorporating therewith a drying oil, adding hydrated ammonium stearate, agitating and adding a basic body to form a water-insoluble soap *in situ* and to liberate ammonia within the mass.

3. The process of making a plastic smooth-troweling cement which comprises melting asphaltic material, thinning with oily material comprising boiled oil, adding an aqueous paste containing ammonium stearate, agitating the mixture with hydrated lime and thereby forming a water-insoluble stearate soap in a finely-divided form disseminated throughout the mass.

4. The process of making a plastic smooth-troweling cement which comprises melting a varnish gum, thinning with a substantially non-volatile oil, adding a solution of a water-soluble stearate, agitating the mixture with a body capable of uniting with stearic acid to form a water-insoluble compound, and in continuing to agitate the mass until a smooth emulsion is formed.

5. A plastic smooth-troweling composition consisting of a fluent emulsion of heavy consistency comprising varnish gums and siccative oil substantially free from volatile thinner, incorporated with flocculent stearate of lime and a filler comprising calcareous material.

6. A plastic smooth-troweling waterproof cement consisting of a fluent emulsion of heavy consistency comprising asphaltic material dissolved in a non-volatile oily menstruum, incorporated with finely-divided precipitated stearate of lime, ammonium hydroxid solution and finely divided filling material; said cement in application freeing easily from the trowel and being substantially devoid of running or dripping properties.

7. A plastic smooth-troweling cement consisting of a fluent emulsion of heavy consistency comprising asphaltic material dissolved in a non-volatile menstruum, incorporated with finely-divided precipitated stearate of lime, ammonium hydroxid solution and a finely-divided filling material; said cement in manual application freeing easily from the trowel and being substantially devoid of running or dripping properties.

8. A plastic smooth-troweling waterproof cement consisting of a fluent emulsion of heavy consistency comprising asphaltic material dissolved in a non-volatile menstruum, incorporated with finely-divided precipitated stearate of lime, an emulsifying agent, and finely-divided filling material; said cement in manual application freeing easily from the trowel and being substantially devoid of running or dripping properties.

9. A plastic smooth-troweling waterproof cement comprising a heavy bodied fluent emulsion the major portion of which consists largely of varnish gums and siccative oil admixed with filling material and incorporated with a water-soluble stearate capable of reacting with lime to form stearate of lime, and an emulsifying agent comprising ammonium hydroxid solution of relatively low strength.

10. A plastic smooth-troweling waterproof cement comprising a heavy bodied fluent emulsion comprising oily materal carrying a thickener of asphaltic material, a water-insoluble metallo-organic compound comprising a salt of a fatty acid, a solution of an alkali, and filling material.

11. A plastic troweling waterproof sealing cement comprising a heavy bodied emulsion of stiffly fluent quality comprising a thickened oil basis, a water-insoluble soap, a finely-divided filler and a solution of ammonium hydroxid; said cement in manual application freeing easily from the trowel.

12. A plastic troweling composition consisting of a fluent emulsion capable of adhering to moisture-containing walls without running or dripping, comprising an oil, a bodying substance therefor, finely-divided water-insoluble soap, a modicum of an alkali solution and finely-divided filling material.

Signed at New York city in the county of New York and State of New York this 4th day of April A. D. 1913.

AARON C. HORN.

Witnesses:
ANNIE GARRIGAN,
J. BOSTER.